United States Patent
Muhassin et al.

(10) Patent No.: US 12,407,808 B2
(45) Date of Patent: Sep. 2, 2025

(54) PERFORMANCE VERIFICATION OF AN IMAGE SENSOR MOUNTED TO A VEHICLE

(71) Applicant: Motional AD LLC, Boston, MA (US)

(72) Inventors: Nijumudheen Muhassin, Pittsburgh, PA (US); Yew Kwang Low, Singapore (SG); Jayesh Dwivedi, Pittsburgh, PA (US); William Buono, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 601 days.

(21) Appl. No.: 17/580,021

(22) Filed: Jan. 20, 2022

(65) Prior Publication Data
US 2023/0231989 A1 Jul. 20, 2023

(51) Int. Cl.
*H04N 17/00* (2006.01)
*B60W 50/02* (2012.01)
(Continued)

(52) U.S. Cl.
CPC ...... *H04N 17/002* (2013.01); *B60W 50/0205* (2013.01); *G02B 27/30* (2013.01);
(Continued)

(58) Field of Classification Search
CPC ...... H04N 17/002; H04N 23/55; H04N 23/57; H04N 17/004; B60W 50/0205; B60W 60/001; B60W 2420/403; G02B 27/30; G02B 27/62; G06T 7/80; G06T 2207/30252; G06T 2207/30244; G06T 7/001; G06T 7/30; G05D 1/0236; G05D 1/0214; G05D 1/0221; G05D 1/0223; G05D 1/024; G05D 1/0242; G05D 1/0251;
(Continued)

(56) References Cited

U.S. PATENT DOCUMENTS

2018/0294376 A1 10/2018 Tian et al.
2019/0324432 A1 10/2019 Cella et al.
(Continued)

FOREIGN PATENT DOCUMENTS

WO WO 2020/123637 A1 6/2020
WO WO 2021/150689 A1 7/2021

OTHER PUBLICATIONS

Korean Office Action issued for Application No. KR 10-2022-0038394, dated Jan. 18, 2024.
(Continued)

*Primary Examiner* — Michael E Teitelbaum
(74) *Attorney, Agent, or Firm* — Knobbe, Martens, Olson & Bear, LLP

(57) ABSTRACT

Provided are methods for verifying the performance of an image sensor mounted to a vehicle, which can include causing alignment of a collimator with an image sensor mounted to a vehicle, receiving sensor data associated with the image sensor based at least in part on causing the alignment of the collimator with the image sensor, determining that the sensor data does not satisfy a performance specification associated with the image sensor, determining an image sensor alert associated with the image sensor based at least in part on determining that the sensor data does not satisfy the performance specification associated with the image sensor, and routing the image sensor alert.

20 Claims, 9 Drawing Sheets

(51) Int. Cl.
  *B60W 60/00* (2020.01)
  *G02B 27/30* (2006.01)
  *G06T 7/80* (2017.01)

(52) U.S. Cl.
  CPC ............ *G06T 7/80* (2017.01); *B60W 60/001* (2020.02); *B60W 2420/403* (2013.01); *G06T 2207/30252* (2013.01)

(58) Field of Classification Search
  CPC .. G05D 1/0255; G05D 1/0257; G05D 1/0276; G05D 1/0278; G05D 1/028; G05D 1/0293; G01S 13/865; G01S 13/867; G01S 17/86; B60R 1/22
  See application file for complete search history.

(56) References Cited

U.S. PATENT DOCUMENTS

| | | |
|---|---|---|
| 2020/0225003 A1 | 7/2020 | Campbell |
| 2020/0272899 A1* | 8/2020 | Dunne .................... G06N 3/08 |
| 2021/0037235 A1* | 2/2021 | Lee ........................ G02B 27/30 |
| 2021/0181058 A1 | 6/2021 | Dumitrescu et al. |
| 2022/0099972 A1* | 3/2022 | Birklbauer ........... H04N 13/344 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2204133.9, dated Apr. 26, 2022.
Great Britain Office Action issued for Application No. GB 2204133.9, dated Sep. 26, 2022.

* cited by examiner

PERFORMANCE VERIFICATION OF AN IMAGE SENSOR MOUNTED TO A VEHICLE

BACKGROUND

Self-driving vehicles typically use sensor data to perceive the area around them. Ensuring that the sensor data received by the self-driving vehicle is accurate can be difficult and complicated.

DETAILED DESCRIPTION

Figure 1:
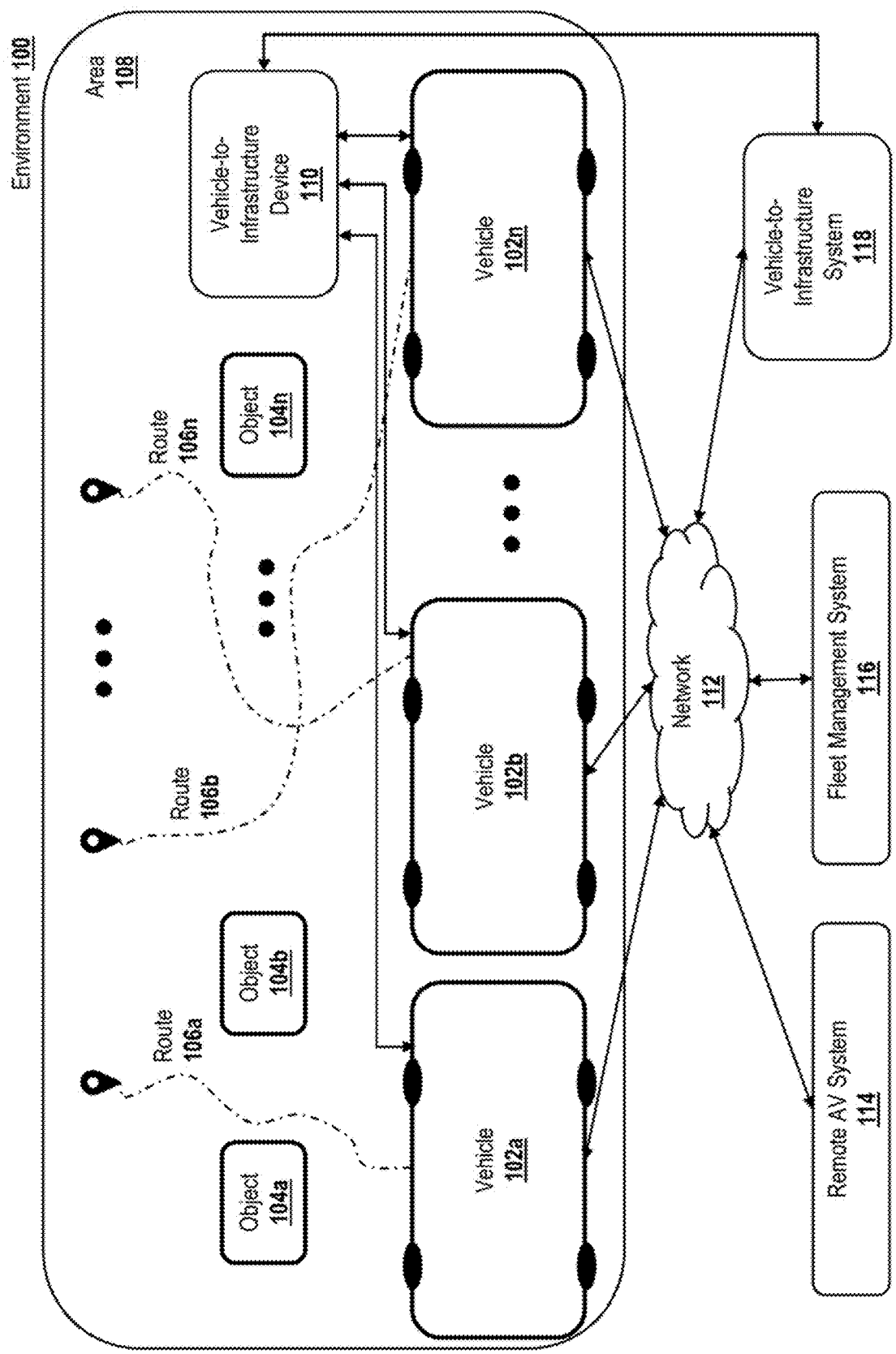
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a signal processing system that causes alignment of an a collimator with an image sensor mounted to a vehicle, receives sensor data associated with the image sensor, determines that the sensor data does not satisfy a performance threshold, determines an image sensor alert, and routes the image sensor alert. The signal processing system can receive sensor data to test the image sensor based on the sensor data. Further, the signal processing system can test the image sensors associated with a vehicle without dismounting the image sensors from the vehicle. The signal processing system can align the image sensors with a plurality of collimators and receive sensor data from the image sensors based on the alignment of the image sensors with the plurality of collimators. Further, the signal processing system can use the sensor data to identify deviations from performance specifications (e.g., performance thresholds). As a non-limiting example, the signal processing system causes alignment of a collimator with an image sensor mounted to a vehicle, receives sensor data associated with the image sensor, determines that the sensor data does not satisfy a performance specification, determines an image sensor alert, and routes the image sensor alert.

By virtue of the implementation of systems, methods, and computer program products described herein, a system can verify the performance of image sensors mounted to a vehicle without dismounting the image sensors from the vehicle. For example, the system may align the image sensors of the vehicle with various collimators (e.g., a frame of collimators) and may receive sensor data based on the alignment of the image sensors with the collimators. Further, the system can utilize the sensor data to identify deviations from performance specifications for each of the image sensors. For example, the system can determine whether the optical performance and/or the intrinsic calibration has deviated from performance specifications. Therefore, the system can more efficiently verify the performance of the image sensors without dismounting (e.g., removing) the image sensors from the vehicle. Further, the system can verify the performance of the image sensors without extrinsic recalibration of the positioning of each image sensor relative to the vehicle (e.g., due to dismounting the image sensors from the vehicle). The verification of the performance of the image sensor without dismounting the image sensor can increase the efficiency of the verification process as certain image sensors can be identified as satisfying the performance specifications and may not be designated for dismounting from the vehicle. Further, based on the identifying that additional image sensors do not satisfy the performance specifications, the additional image sensors can be designated for dismounting for recalibration. In some cases, the system can update the parameters of the image sensors based on the verification of the performance of the image sensors. Such an efficient performance verification can improve the quality and efficiency of the testing and recalibration of the image sensors.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
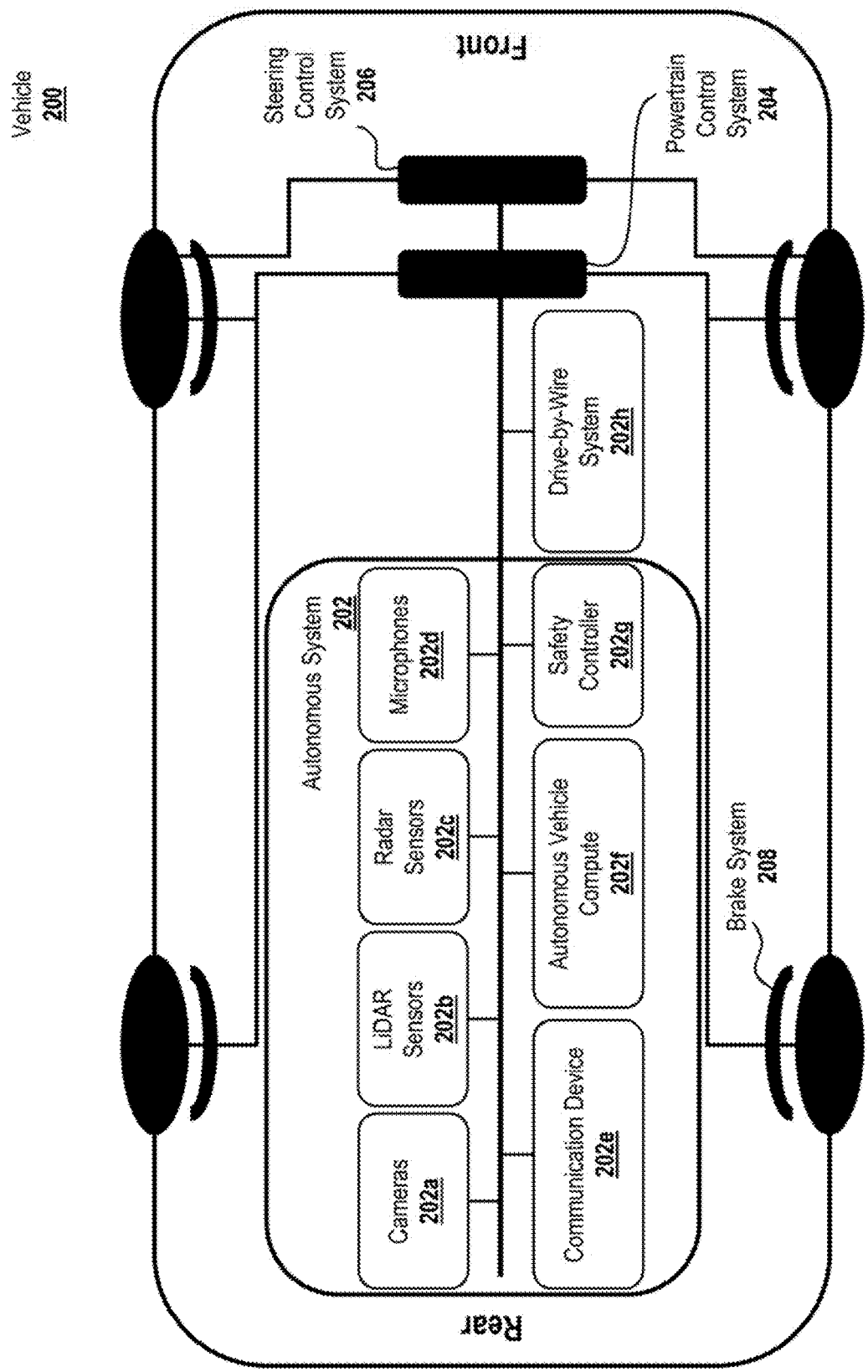
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
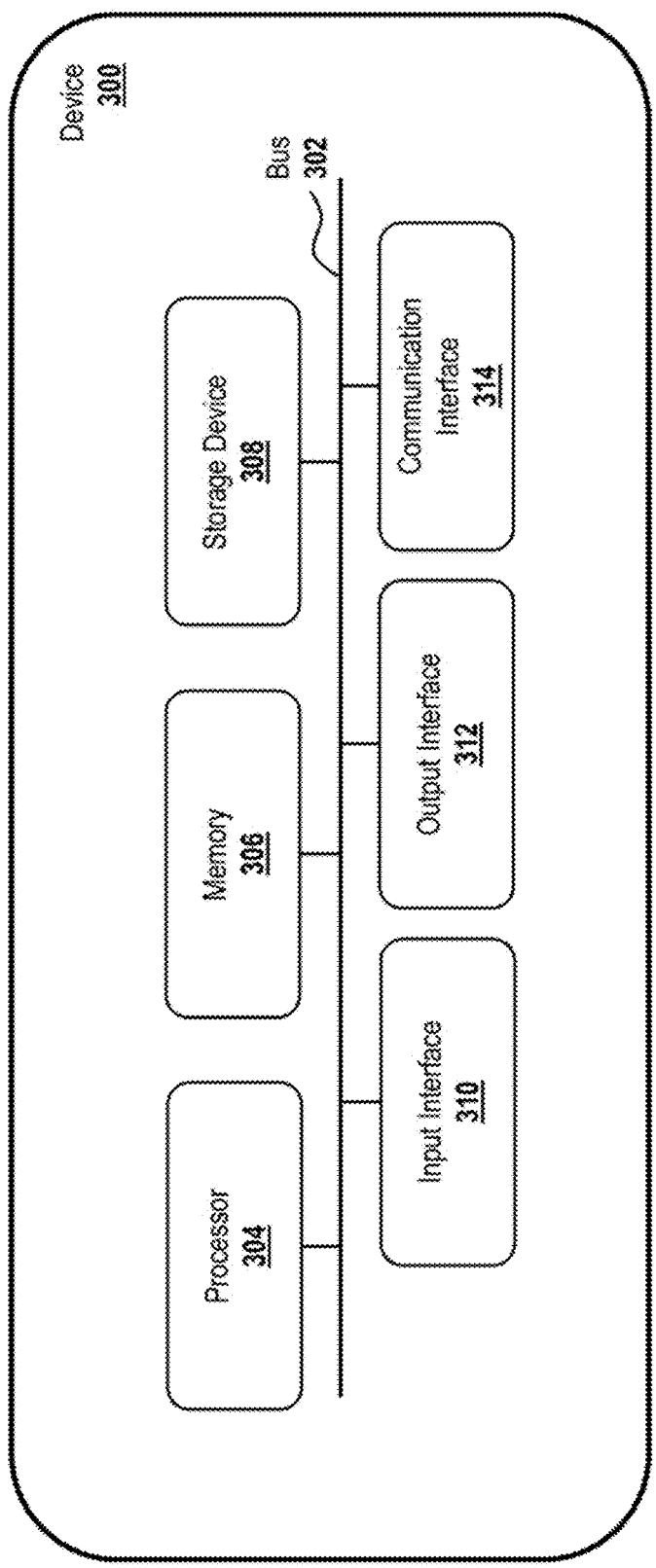
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
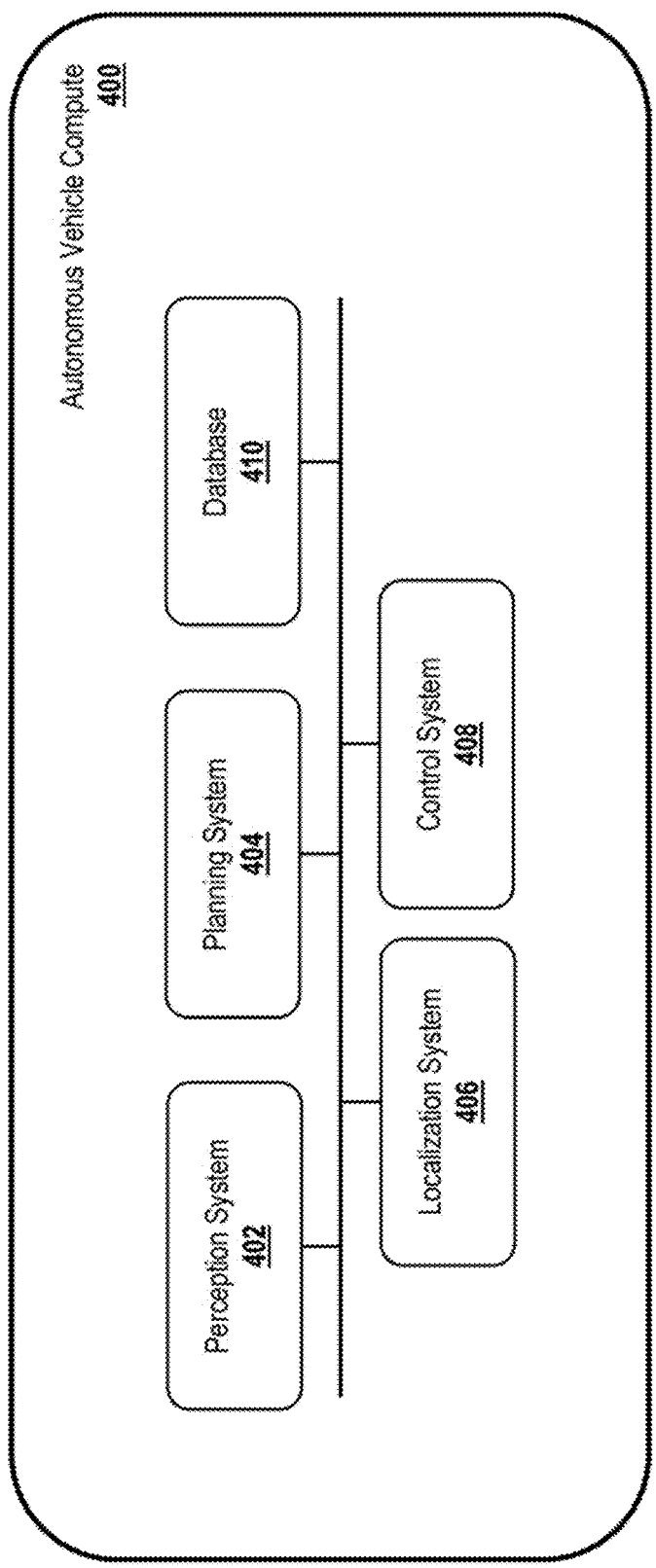
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Verifying Performance of Image Sensors of a Vehicle

As a vehicle (e.g., an autonomous vehicle) moves through an area, the vehicle may encounter a number of different objects within the area. To identify the objects, the vehicle can capture sensor data associated with at least one sensor. The sensors can include any one or any combination of radar sensors, lidar sensors, cameras, etc. The vehicle can process the captured sensor data to obtain environmental data associated with an environment of the vehicle. Based on the environmental data, the vehicle can determine how to navigate the environment and potential obstacles within the environment that are captured by the sensor data. Further, the vehicle can navigate the environment based on the determination. For example, the vehicle can include a navigational system to assist in navigation based on the environmental data.

It may be important to ensure that each of the image sensors be calibrated to determine an accuracy of the received image data. Further, each of the image sensors can be extrinsically calibrated relative to the vehicle and/or one or more components of the vehicle and intrinsically calibrated. The extrinsic calibration of the image sensors can include calibrating a positioning of each of the image sensors relative to the positioning of the vehicle, the positioning of additional image sensors, or the positioning of any other component of the vehicle. The image sensors may be mounted to the vehicle based on the extrinsic calibration of the image sensors. The intrinsic calibration of the image sensors can include calibrating one or more parameters of the image sensor used by the image sensor to generate the sensor data. For example, the parameters of the image sensor may include focal length, image sensor format, principal point, or skew. The image sensors may be mounted to the vehicle based on the extrinsic calibration and the intrinsic calibration (e.g., the image sensors may have an initial extrinsic calibration and an initial intrinsic calibration when mounted to the vehicle). The vehicle may use the initial extrinsic calibration and initial intrinsic calibration of each image sensor to identify objects in the environment of the vehicle based on the received sensor data.

During the operation of a vehicle, the performance (e.g., optimal performance) of the image sensors may degrade. For example, the optical performance may degrade from a particular performance specification. Further, it may be desirable to further calibrate one or more parameters of the image sensor. Degradations in the performance of the image sensors can decrease the safety of the vehicle for passengers as the system may not be able to accurately identify objects or features of an image (e.g., a position of another vehicle relative to the image sensor). For example, the performance of the image sensor may degrade and the images produced by the image sensor may be increasingly overexposed or underexposed, thereby making it difficult for the perception system to detect objects in the images. This can also lead to an inadequate user experience as the perception system may be unable to identify particular objects or features of an image. In some cases, the image sensors can be recalibrated by dismounting the image sensors from the vehicle and individually calibrating each image sensor. However, such a dismounting of the image sensors for calibration can be expensive and time consuming. Further, in some cases, the dismounting of the image sensors may not be appropriate for each user. This can lead to an inadequate user experience as the system may be limited to recalibrating image sensors that are each dismounted from the vehicle.

To address these issues, a signal processing system can use one or more collimators (e.g., collimators aligned in a frame) to verify the performance of the image sensors without dismounting the image sensors from the vehicle. By aligning the one or more collimators with the image sensors, the signal processing system can obtain sensor data from the image sensors and verify the performance of the image sensors without dismounting the image sensors. In some cases, the signal processing system can verify the optical performance and/or the intrinsic calibration of the image sensors As described herein, the signal processing system can cause alignment of the one or more collimators with the one or more image sensors mounted to a vehicle. In some cases, the signal processing system can cause a robot (e.g., a robotic arm) to align the one or more collimators with the one or more image sensors. For example, the signal processing system can instruct the robot to move the collimators (e.g., the collimators aligned in a frame) to a particular position based on the position of the vehicle. In some embodiments, the alignment of the one or more collimators with the one or more image sensors may be customized based on the make of the vehicle, the model of the vehicle, the year of the vehicle, the type of the vehicle, any modifications to the vehicle, a number and/or type of image sensors mounted to the vehicle, or any other data associated with the vehicle. For example, the signal processing can instruct a robot to move the one or more collimators to a specific position for a pickup truck and a different position for a sedan.

Further, the signal processing system can obtain sensor data associated with the image sensors based on causing alignment of the one or more collimators with the one or more image sensors. The sensor data can include, but is not limited to, image data associated with one or more images outside of the vehicle (e.g., lidar data associated with a lidar sensor, radar data associated with a radar sensor, camera image data associated with a camera image).

Based on the obtained sensor data, the signal processing system can determine whether the sensor data satisfies a performance specification. In some cases, the signal processing system can process the sensor data to identify a performance of the one or more image sensors. For example, the signal processing system can process the sensor data to identify an optical performance of the one or more image sensors and/or updated parameters for the image sensor. Further, the signal processing system can compare a value identifying the performance of the one or more image sensors with a performance specification (e.g., a performance threshold). In some cases, the performance specification may include an optical performance specification and/or original parameters for the image sensor.

Further, the signal processing system can determine an image sensor alert based on comparing the performance of the one or more image sensors to the performance specification. In some cases, the signal processing system can determine the image sensor alert using alert mapping data. In some embodiments, different values for the performance of the one or more image sensors can be mapped to different image sensor alerts using the alert mapping data. For example, a first performance value that differs from a performance specification by 50% and a second performance value that differs from the performance specification by 80% may be mapped to different image sensor alerts. Accordingly, based on the performance of the one or more sensors and the performance specification, the signal processing system can identify an image sensor alert.

The signal processing system may route the image sensor alert based on the type of the image sensor alert. In some cases, the signal processing system may route the image sensor alert to a computing device and the image sensor alert may identify that a particular image sensor should be dismounted from the vehicle for further testing and/or recalibration. Further, the signal processing system may route the image sensor alert to a computing device and the image sensor alert may identify that the parameters of the particular image sensor should be updated. In some embodiments, by routing the image sensor alert, the signal processing system may route the particular image sensor for further testing and/or may update the parameters of the image sensor.

Figure 5:
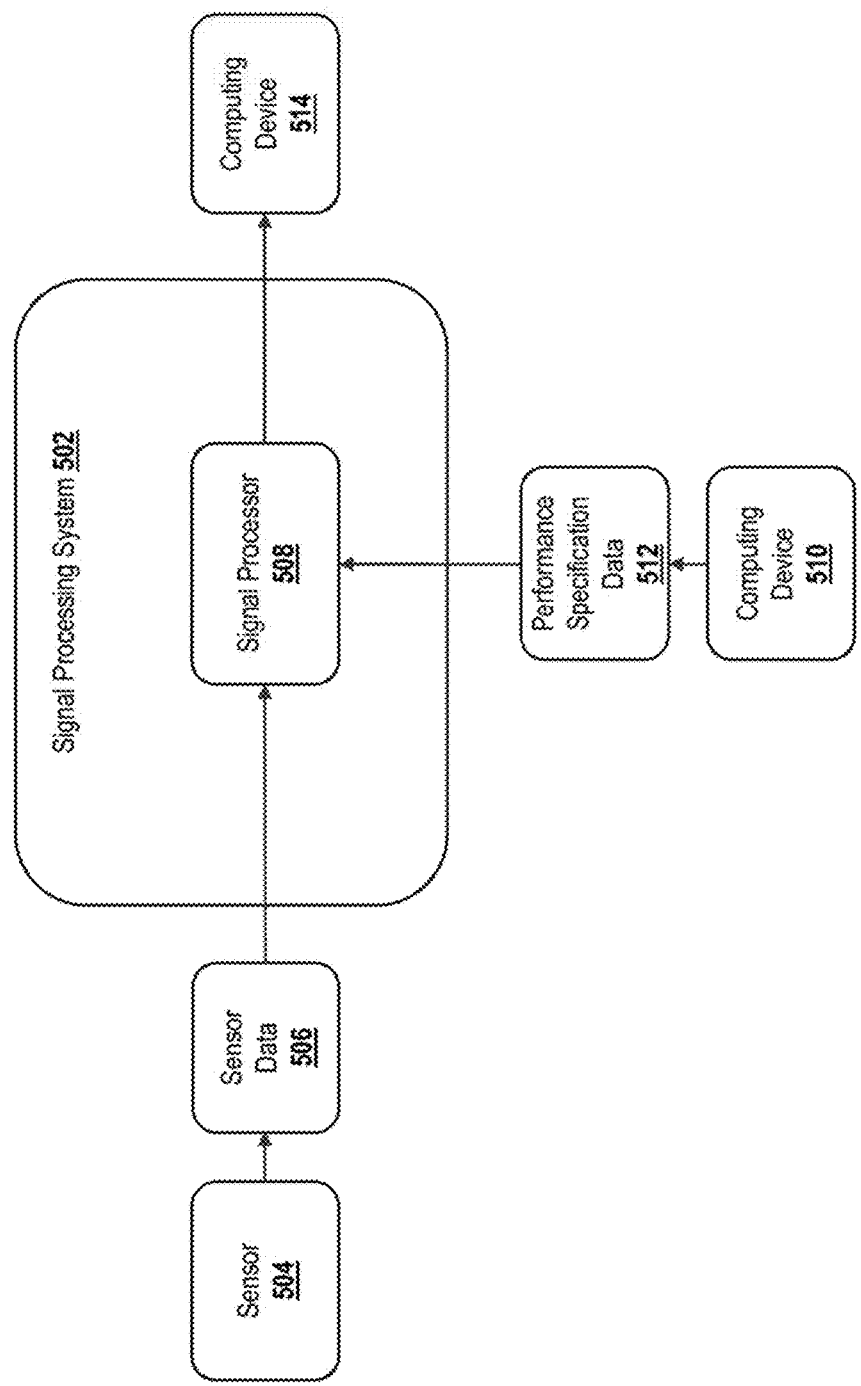
FIG. 5 is a block diagram illustrating an example of a signal processing system.

FIG. 5 is a block diagram illustrating an example of a signal processing environment 500. In the illustrated example, the signal processing environment 500 includes a signal processing system 502 communicatively coupled with a sensor 504, a computing device 510, and a computing device 514. In some cases, the signal processing environment 500 and/or the signal processing system 502 can form at least a part of the perception system 402, described herein at least with reference to FIG. 4. The signal processing system 502 can receive sensor data 506 associated with the sensor 504, and use the sensor data 506 to identify performance data associated with the sensor data 506. Further, the signal processing system 502 can determine alert data associated with a vehicle alert. In some cases, the signal processing system 502 can use alert mapping data associated with a mapping of sensor data (and/or performance data) to alert data to determine which image sensor alerts to activate based on incoming sensor data 506.

The signal processing system 502 (or another computing system) may cause alignment of one or more collimators, not shown in FIG. 5, with the sensor 504. As will be discussed below, the signal processing system 502 can cause the alignment of multiple collimators with multiple image sensors. In some cases, the signal processing system 502 may determine whether the one or more collimators are aligned with the sensor 504 based on the sensor data 506 identifying a slanted edge. The signal processing system 502 may cause alignment of the one or more collimators with the sensor 504 by aligning the axis of the one or more collimators with the axis of the sensor 504.

Based on the alignment of the one or more collimators with the sensor 504, the sensor 504 generates sensor data 506 and communicates the sensor data 506 to the signal processing system 502. In some cases, the signal processing system 502 may cause the sensor 504 to generate the sensor data 506 based on the alignment of the one or more collimators with the sensor 504. The sensor 504 can include any one or any combination of a camera 202a, LiDAR sensor 202b, radar sensor 202c, etc., similar to that described above with reference to FIG. 2. In some embodiments, the sensor 504 may include a plurality of sensors (e.g., a plurality of different sensors) that may each provide sensor data 506 to the signal processing system 502. Similarly, the sensor data 506 can include different types of sensor data, such as camera data associated with a camera image, radar data associated with a radar image, LiDAR data associated with a point cloud, etc. Further, the sensor data 506 can include sensor data associated with an environment outside of the vehicle. The sensor 504 may generate sensor data 506 based on one or more sensor signal processing settings (e.g., white balance, gain, tint, exposure, color balance, saturation, etc.). For example, the one or more sensor signal processing settings may identify a time period for detection of the sensor data. The sensor data 506 may include streaming sensor data and/or batch sensor data.

The sensor 504 generates the sensor data 506 based on intrinsic parameters and extrinsic parameters. The intrinsic parameters may include any one or any combination of a scale factor, a focal length, a principal point (e.g., a sensor center), a skew, a geometric distortion, etc. associated with the sensor 504 and the extrinsic parameters may include a rotation, a translation, etc. associated with the sensor 504. The sensor 504 may utilize the intrinsic parameters to map the sensor data from three-dimensional world points to a two-dimensional image plane.

The signal processor 508 (or another computing system) may calibrate the sensor 504 to identify a first set of intrinsic parameters for generating the sensor data 506. The sensor 504 may be calibrated based on a series of images. For example, the sensor 504 may be calibrated using two-dimensional sensor calibration (e.g., using a particular two-dimensional pattern), three-dimensional sensor calibration, or self-calibration to identify the first set of intrinsic parameters. Based on the calibration of the sensor 504, the sensor 504 may identify the first set of intrinsic parameters and may generate the sensor data 506 based on the first set of intrinsic parameters.

In the illustrated example, the signal processing system 502 includes a signal processor 508 to receive the sensor data 506, however, it will be understood that the signal processing system 502 can include fewer, more, or different components. The signal processor 508 may process the sensor data 506 to generate performance data. In some cases, the signal processor 508 may process the sensor data 506 to identify optical performance data (e.g., a measurement of the optical performance potential) associated with the sensor data 506 and the sensor 504. For example, the signal processor 508 may process the sensor data 506 to identify a modulation transfer function ("MTF"). The optical performance data may identify the contrast and/or resolution of a lens of the sensor 504.

To identify the MTF, the signal processor 508 can receive sensor data 506 identifying a collimated beam of light from the sensor 504. The signal processor 508 can identify a line spread function from the sensor data 506 and apply a Fourier transform to the line spread function to obtain the MTF.

In some cases, the signal processor 508 may process the sensor data 506 to identify a second set of intrinsic parameters. The second set of intrinsic parameters may include any one or any combination of a scale factor, a focal length, a principal point (e.g., a sensor center), a skew, a geometric distortion, etc. associated with the sensor 504. The second set of intrinsic parameters may include a modification to any one of the first set of intrinsic parameters. For example, the first set of intrinsic parameters may include a scale factor and the second set of intrinsic parameters may include a modified scale factor. The signal processor 508 may process the sensor data 506 to recalibrate the sensor 504 to identify a second set of intrinsic parameters for generating the sensor data 506. For example, the signal processor 508 may recalibrate the sensor 504 using the sensor data 506 to identify the second set of intrinsic parameters. Accordingly, the signal processor 508 can generate performance data (e.g., optical performance data, a second set of intrinsic parameters, etc.) using the sensor data 506.

The signal processor 508 may also receive performance specification data 512 associated with one or more performance specifications of the sensor 504. The signal processor 508 may receive the performance specification data 512 from a computing device 510 and/or a data store. In some cases, the signal processor 508 may parse the performance specification data 512 to identify a subset of the performance specification data 512 associated with the image sensor (e.g., based on the type of image sensor). The performance specification data 512 may include predetermined performance specifications associated with the image sensor. For example, the performance specification data 512 may include a predetermined optical performance specification for the image sensor. In some cases, the performance specification data 512 may include the first set of intrinsic parameters. Further, the performance specification data 512 may include a plurality of values (e.g., thresholds, ranges, etc.) identifying one or more specifications of the sensor 504.

Further, the signal processor 508 may compare the performance data with the performance specification data 512. In some cases, the signal processor 508 may compare the optical performance data with the optical performance specification and/or may compare the first set of intrinsic parameters with the second set of intrinsic parameters. Based on comparing the performance data with the performance specification data 512, the signal processor 508 may determine whether the performance data satisfies the performance specification data 512. For example, the signal processor 508 may determine whether values of the performance data match values of the performance specification data 512. In some embodiments, the signal processor 508 may determine whether the values of the performance data are greater than a value of the performance specification data 512 (e.g., where the performance specification data 512 includes a minimum value) and/or are less than a value of the performance specification data 512 (e.g., where the performance specification data includes a maximum value). Accordingly, the signal processor 508 may determine whether the performance data satisfies the performance specification data 512 (e.g., matches a value of the performance specification data 512, satisfies a threshold or range of the performance specification data 512, etc.).

Based on comparing the performance data with the performance specification data 512, the signal processor 508 may identify a difference between the performance data and the performance specification data 512. In some cases, the signal processor 508 may identify an amount of difference between the performance data and the performance specification data 512 (e.g., the quantifiable amount by which the performance data and the performance specification data 512 differ.

The signal processor 508 may further obtain alert mapping data. For example, the signal processor 508 may obtain alert mapping data from a computing device (e.g., a user computing device) and/or a data store. For example, the user computing device may generate the alert mapping data and provide the alert mapping data to the signal processor 508. In some embodiments, the alert mapping data may be user specific and/or image sensor specific alert mapping data. The alert mapping data may include a plurality of mappings. The alert mapping data may include first alert mapping data and second alert mapping data. Each mapping of the first alert mapping data may identify a difference between performance data and performance specification data 512 mapped to a particular image sensor alert. Each mapping of the second alert mapping data may identify a particular image sensor alert mapped to particular alert data. In some cases, each mapping of the alert mapping data may identify a difference between performance data and performance specification data 512 mapped to particular alert data.

Based on identifying alert data 516 using the alert mapping data, the signal processor 508 may determine that a user should be notified of the image sensor alert. In some cases, the signal processor 508 may use alert mapping data associated with a mapping of the difference between the performance data and the performance specification data to alert data to determine the alert data to output to the computing device 514. Accordingly, the signal processor 508 can provide the alert data to the computing device 514.

The alert data may include a recommendation (e.g., an instruction) for a user to perform further calibration and/or testing of the sensor 504. For example, the alert data may include a recommendation for a user to perform manual calibration of the sensor 504. Further, the signal processor 508 may cause the sensor 504 to be routed for additional calibration. For example, the signal processor 508 may send the alert data to a robot to activate the robot. The signal processor 508 may activate the robot to cause the robot to transport the sensor 504 for additional calibration. In some cases, the alert data may identify the type of further calibration to be performed for the sensor 504.

In some cases, the signal processor 508 may cause the computing device 514 to replace the intrinsic parameters of the sensor 504 based on sending the alert data to the computing device 514. Further, in response to receiving the alert data, the computing device may automatically replace the first set of intrinsic parameters with the second set of intrinsic parameters.

Example Frame of Collimators

Figure 6:
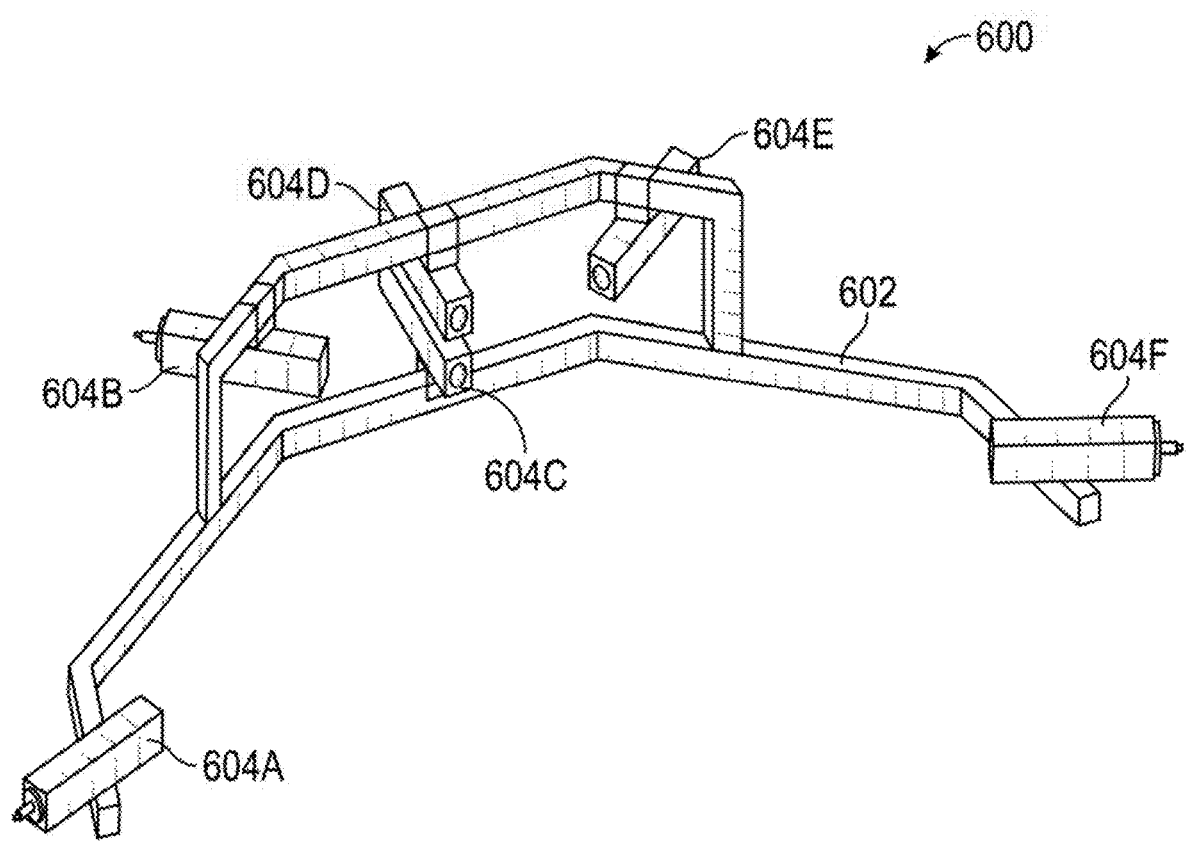
FIG. 6 is a diagram illustrating an example frame including a plurality of collimators.

FIG. 6 is a diagram 600 illustrating example frame including a plurality of collimators. For example, the diagram 600 includes a plurality of collimators that are each affixed to a frame 602 (e.g., a rig, a support, a fixture, etc.). Each of the plurality of collimators can be mapped to a particular position on the frame 602. Further, each of the plurality of collimators can be affixed to the frame 602 based on the mapping. In the example of FIG. 6, the plurality of collimators includes a first collimator 604A, a second collimator 604B, a third collimator 604C, a fourth collimator 604D, a fifth collimator 604E, and a sixth collimator 604F that are each affixed to the frame 602. It will be understood that the plurality of collimators may include more, less, or different collimators.

Each of the plurality of collimators can receive a beam of light and produce a collimated beam of light. For example, each of the plurality of collimators can receive a beam of light from a light source and produce the collimated beam of light. In some embodiments, one or more of the plurality of collimators may include an associated light source to produce the beam of light. Further, each of the plurality of collimators may include a curved mirror, a lens, etc. to produce the collimated beam of light from the beam of light.

In some cases, one or more of the plurality of collimators may be arranged between a laser (e.g., a solid-state laser) and a diffractive optical element. Further, the optical axes of the laser, the particular collimator, and the diffractive optical element may be mutually aligned along a particular optical path. The laser may output a beam of light (e.g., a laser beam) to the particular collimator. In some embodiments, the laser may be a fiber laser. For example, a fiber optic cable may be an amplification medium (e.g., an active gain medium) of the laser. One or more laser diodes may provide light to the fiber optic cable to cause the fiber optic cable to produce an amplified beam of light which may be output by the laser. Further, the collimator may be a fiber optic collimator to receive the amplified beam of light and produce a collimated beam of light. In some cases, the laser may output the beam of light through a beam expanding lens. The beam expanding lens can expand the beam of light and provides the expanded beam of light to the particular collimator. In other cases, the particular collimator may be a beam expanding collimator and may expand the beam of light output by the laser to provide an expanded beam of light. Further, the particular collimator may output a collimated beam of light based on the light beam provided by the laser (or the expanded light beam provided by the beam expanding lens).

The diffractive optical element may receive the collimated beam of light from the particular collimator. Further, the diffractive optical element may split the collimated beam of light into multiple beams of light by passing the collimated beam through various apertures of a first surface of the diffractive optical element. The diffractive optical element may output the multiple beams of lights through various ridges of a second surface of the diffractive optical element to provide the multiple beams of light to a lens of a sensor (e.g., sensor 504). As discussed above, the performance of the sensor may be verified using the multiple beams of light. For example, the multiple beams of light may enable calculation of at least one intrinsic parameter (e.g., a scale factor, a focal length, a principal point (e.g., a sensor center), a skew, a geometric distortion, etc. associated with the sensor) or an optical performance of the sensor.

The diffractive optical element may be designed to produce the multiple beams of light. For example, a grating angle of the diffractive optical element may be predetermined based on a desired number of light beams in which a primary light beam is to be split. Further, the diffractive optical element may be designed based on a field of view and/or a resolution of a sensor. For instance, for a sensor having a field of view of 30 degrees and a resolution of 2 degrees, the diffractive optical element may split a primary light beam into 15 light beams to cover each 2-degree resolution interval from the 30 degrees of the field of view. In some cases, size of a primary light beam and/or a size of the multiple light beams into which the primary light beam is split by the diffractive optical element may be defined based on a cross-sectional area of the diffractive optical element, such as by sizing the apertures to utilize a maximal amount of cross-sectional area of a side of the diffractive optical element.

In the example of FIG. 6, the first collimator 604A is affixed to the frame 602 at a first position, the second collimator 604B is affixed to the frame 602 at a second position, the third collimator 604C is affixed to the frame 602 at a third position, the fourth collimator 604D is affixed to the frame 602 at a fourth position, the fifth collimator 604E is affixed to the frame 602 at a fifth position, and the sixth collimator 604F is affixed to the frame 602 at a sixth position. It will be understood that each of the plurality of collimators may be affixed to the frame at more, less, or different positions.

The positioning of each of the plurality of collimators relative to the frame 602 may be based on the particular type of vehicle (e.g., characteristics of the vehicle, features of the vehicle, etc.) and/or a particular configuration of the set of sensors associated with the vehicle. As each vehicle may have different characteristics (e.g., height, width, etc.) and/or features (e.g., luggage rack, different sensors, etc.) and the sensors of the vehicle may have different configurations (e.g., multiple sensors positioned in a forward direction), the frame 602 and/or the positioning of the plurality of collimators relative to the frame 602 for each vehicle may be different. Accordingly, the frame 602 and the plurality of collimators may correspond to a subset of vehicles that share particular characteristics based on the type of vehicle and/or the configuration of the image sensors. Further, a first vehicle with sensors configured in a first configuration and a second vehicle with sensors configured in a second configuration may correspond to and/or may utilize different frames, each with different collimators affixed in different positions.

Further, each of the plurality of collimators may be positioned relative to the frame 602 based on the number and/or positioning of a plurality of sensors relative to a vehicle. For example, the vehicle may include six sensors for performance verification. Further, the first collimator 604A may be affixed to the frame 602 at a first position relative to a position of a first sensor, the second collimator 604B may be affixed to the frame 602 at a second position relative to a position of a second sensor, the third collimator 604C may be affixed to the frame 602 at a third position relative to a position of a third sensor, the fourth collimator 604D may be affixed to the frame 602 at a fourth position relative to a position of a fourth sensor, the fifth collimator 604E may be affixed to the frame 602 at a fifth position relative to a position of a fifth sensor, and the sixth collimator 604F may be affixed to the frame 602 at a sixth position relative to a position of a sixth sensor.

Further, a system may analyze the type of vehicle and/or the particular configuration of the set of sensors associated with the vehicle and determine positioning data for each of the plurality of collimators. For example, the system may determine positioning data associated with the particular type of vehicle and/or the particular configuration of the set of sensors associated with the vehicle. Further, the system may identify a frame 602 associated with the positioning data.

In some cases, a system may map the positioning of each of the plurality of collimators based on the type of vehicle and/or the particular configuration of the set of sensors associated with the vehicle. For example, the system may receive data associated with the vehicle and identifying the type of vehicle, the configuration of the set of sensors associated with the vehicle, etc. Based on the received data, the system may generate positioning data that identifies a position for each of the plurality of collimators relative to the frame 602. In some cases, the system may provide the positioning data to a separate system associated with the design of the frame 602. Based on the positioning data, each of the plurality of collimators may be affixed to the frame 602. For example, the system may cause a robot to affix each of the plurality of collimators to the frame 602 based on the positioning data and/or automatically adjust the position and orientation of the collimators based on the positioning data.

In some cases, the positioning data may be customized for a particular group of users, a particular user, etc. For example, the system may identify data associated with the user (e.g., a user location, a user grouping, a user profile) and identify positioning data associated with the user. In some embodiments, a user, via a user computing device, may define the positioning data for affixing the plurality of collimators to the frame 602.

In some cases, the plurality of collimators may not be affixed to the frame 602. Further, each of the plurality of collimators may be individually positioned to interact with a sensor of the vehicle. The positioning data may define a position for each of the plurality of collimators relative to the vehicle, a particular sensor of the vehicle, or any other reference points. The signal processing system may use the positioning data to concurrently calibrate multiple image sensors mounted to a vehicle.

Robot for Adjusting Frame of Collimators

Figure 7:
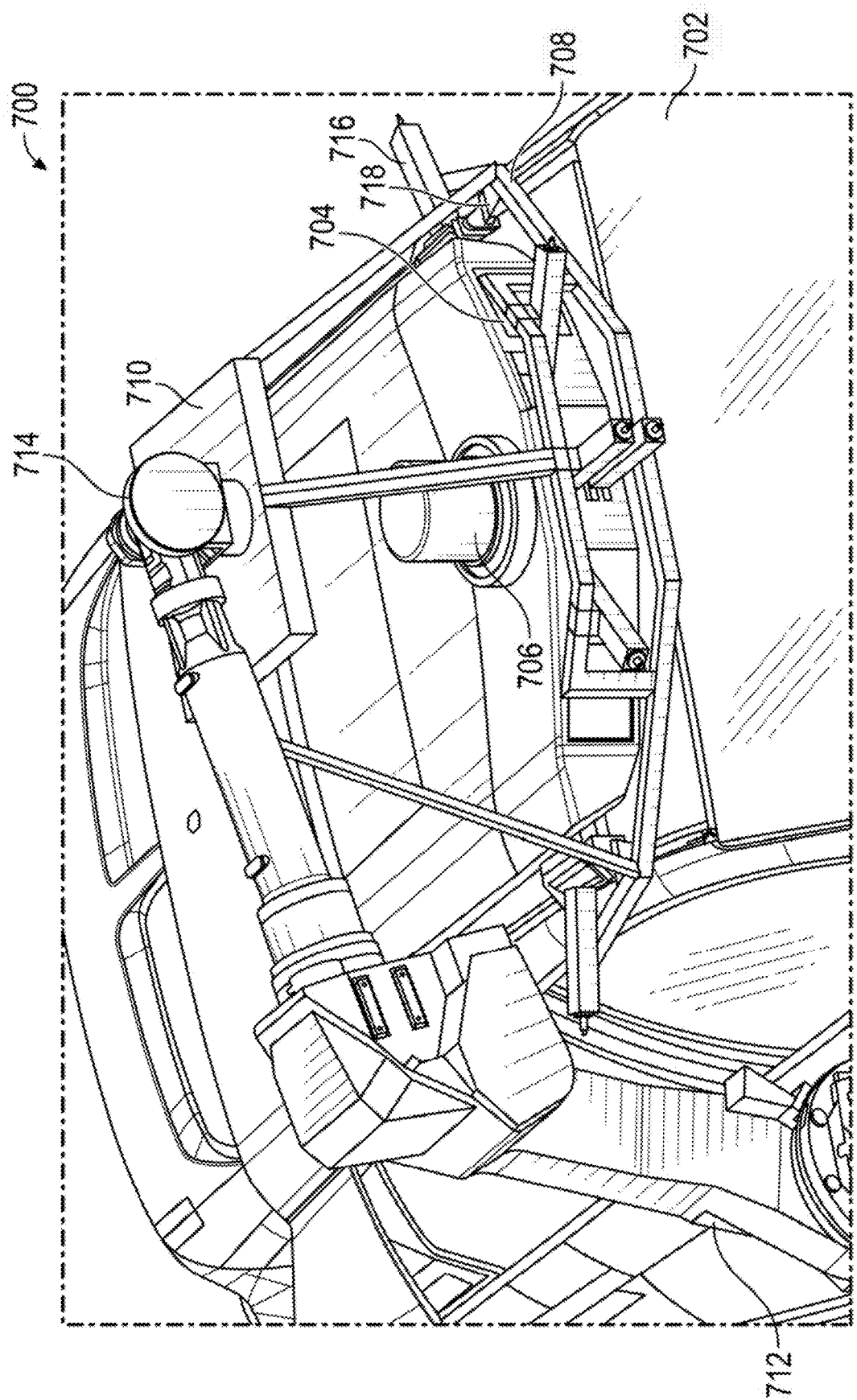
FIG. 7 is an example environment in which a vehicle including one or more sensors and a frame including a plurality of collimators can be implemented.

FIG. 7 illustrates an example environment 700 of an exterior of a vehicle 702 including one or more sensors 704 for which the performance can be verified using a frame 708 of one or more collimators 716. The vehicle 702 may include the one or more sensors 704 to generate sensor data to identify objects in an environment of the vehicle. Further, a signal processing system may verify the performance of the one or more sensors 704 using the one or more collimators 716 on the frame 708. For example, the one or more collimators 716 may produce collimated beams of light and the one or more sensors 704 may produce sensor data based on the collimated beams of light. Further, the signal processing system may receive the sensor data and verify the performance of the one or more sensors 704.

In the illustrated example of FIG. 7, the environment 700 includes a portion of an exterior of a vehicle 702. In the illustrated example, the vehicle 702 includes an enclosure for one or more image sensors on the roof of the vehicle 702. It will be understood, however, that the vehicle 702 can be configured in a variety of ways. For example, the vehicle 702 may include multiple enclosures for image sensors and/or may include image sensors located at different positions relative to the vehicle (e.g., the vehicle 702 may include a first enclosure of sensors on the side of the vehicle and a second enclosure of sensors on the roof of the vehicle). The enclosure(s) for one or more sensors can be separate from the vehicle 702 (e.g., an attachment to the vehicle) or can be integrated into the vehicle 702 (e.g., the enclosure may be a door panel, a rim, etc. of the vehicle and the sensor may be embedded within the vehicle 702).

The illustrated environment 700 further includes a frame 708 with collimators 716 attached thereto. It will be understood that the frame 708 can include one or more collimators 716 affixed at different locations relative to the frame 708. The frame 708 may include (e.g., may be affixed to, attached to, etc.) an additional frame 710. In some embodiments, the frame 708 and the additional frame 710 may correspond to a single frame.

The illustrated environment 700 includes a robot 712. For example, the robot 712 may be any multi-axis robot (e.g., a Fanuc M-710iC/50 robot). The robot 712 may include a robotic arm 714. For example, the robot 712 may include a flexible robotic arm 714 with n degrees of freedom, where n can be any number (e.g., the flexible robotic arm 714 may have 12 degrees of freedom). The robotic arm 714 may be maneuverable within the illustrated environment 700. It will be understood that any type of robot 712 may be used. For example, the robot 712 may include more, less, or different components (e.g., the robot 712 may include multiple robotic arms).

The signal processing system can identify the presence of a vehicle 702 within the illustrated environment 700. For example, the signal processing system can receive vehicle data from one or more sensors (e.g., pressure sensors, motion sensors, etc.) identifying the presence of the vehicle 702 within the environment. Further, the signal processing system can identify a type of the vehicle 702 and/or a configuration of sensors 704 associated with the vehicle 702. For example, the signal processing system can identify the type of the vehicle 702 and/or the configuration of sensors 704 based on the vehicle data. In some embodiments, the signal processing system may receive input (e.g., from a user computing device) identifying the presence of the vehicle 702, the type of the vehicle 702, and/or the configuration of the sensors 704.

Based on identifying the presence of the vehicle 702, the type of the vehicle 702, and/or the configuration of the sensors 704, the signal processing system may identify particular positioning data associated with the vehicle and/or the one or more sensors associated with the vehicle. The positioning data may identify a particular position for each of the one or more collimators 716 relative to a frame 708. The signal processing system may further identify positioning data to cause an alignment of the optical axis of each of the one or more sensors 704 of the vehicle 702 with an optical axis of a corresponding collimator of the one or more collimators 716 of the frame 708.

Further, the signal processing system, in response to the positioning data, may cause each of the one or more collimators 716 to be affixed to the frame 708 based on the positioning data. In some cases, the positioning data may identify a particular frame 708 of one or more collimators 716 (e.g., a preassembled frame of collimators). Based on the positioning data, the signal processing system may identify the frame 708 of one or more collimators 716. Further, the signal processing system may provide instructions to the robot 712. The instructions may cause the robot 712 (e.g., using the robotic arm 714) to obtain the frame 708.

To obtain the frame 708, the robot 712 may identify the additional frame 710 and utilize the additional frame 710 to obtain the frame 708. For example, the additional frame 710 may include a platform that enables the robotic arm 714 of the robot 712 to interact with the additional frame 710 and obtain the frame 708. In some embodiments, the robot 712 may directly obtain the frame 708 without obtaining the additional frame 710. For example, the robotic arm 714 may obtain and move the frame 708 by directly interacting with the frame 708. In other embodiments, the frame 708 and the additional frame 710 may be affixed and the robot 712 may obtain the frame 708 and the additional frame 710 simultaneously.

Further, based on identifying the presence of the vehicle 702, the type of the vehicle 702, and/or the configuration of the sensors 704, the signal processing system may identify alignment data associated with the vehicle 702 and identify how to align the frame 708 with the vehicle 702. The alignment data may be based on the positioning data of the one or more collimators 716 and/or positioning data of the one or more sensors 704. The alignment data may identify a position of the frame 708 relative to the vehicle 702 for alignment of the frame 708 with the vehicle 702. As seen in FIG. 7, the vehicle 702 includes a reference location 706. The alignment data may identify a position relative to the reference location 706. Further, the signal processing system may identify the reference location 706 and may use the alignment data to identify a position for the frame 708 relative to the reference location 706. Based on identifying the position for the frame 708, the signal processing system may provide further instructions to the robot 712. The further instructions may cause the robot 712 (e.g., using the robotic arm 714) to move the frame 708 to the particular position. Accordingly, the robot 712 may cause alignment of the one or more sensors 704 with the one or more collimators 716 based on moving the frame to the particular position.

In some cases, a robot 712 may not place the frame 708. Instead, the frame 708 may be prepositioned in a particular location for a particular vehicle. For example, a vehicle may be driven to a prepositioned frame 708 to interact with the one or more collimators 716 of the frame 708 to verify performance of the one or more sensors 704 of the vehicle 702.

In some cases, the vehicle 702 may include one or more fixtures 718. The robot 712 may cause alignment of the one or more sensors 704 with the one or more collimators 716 by affixing the frame 708 to the one or more fixtures 718.

Based on the alignment of the one or more sensors 704 with the one or more collimators 716, the signal processing system can receive sensor data from the one or more sensors 704. As discussed above, the signal processing system can use the sensor data to verify a performance of each of the one or more sensors 704.

During operation of the one or more collimators 716, the positioning of the one or more collimators 716 relative to the frame 708 may degrade. For example, the positioning of the one or more collimators 716 may degrade due to creep, vibration, expansion, contraction, etc. To identify whether the positioning of the one or more collimators 716 has degraded relative to original positioning data, the signal processing system may receive sensor data from the one or more sensors 704. Further, the signal processing system may obtain the sensor data and identify an MTF for each of the one or more sensors 704. The MTF may identify a slanted edge. For example, the slanted edge may identify a difference in contrast between a first portion of the sensor data and a second portion of the sensor data.

Further, each sensor of the one or more sensors 704 may be associated with a particular region of interest. The region of interest can include a contiguous set of pixels of the sensor and may be any shape. The region of interest of a particular sensor may be based on the positioning (e.g., orientation, location, etc.) of the particular sensor. Each of the one or more sensors 704 may have one or more regions of interest. For example, a particular sensor 704 may have a region of interest in the center of the sensor. The sensor 704 may designate the region of interest as a region of interest based on the region of interest identifying particular sensor data (e.g., the center of the captured sensor data). As another example, the region of interest may include a corner portion of the sensor a side portion (left or right), top/bottom portion, etc.

Figure 8:
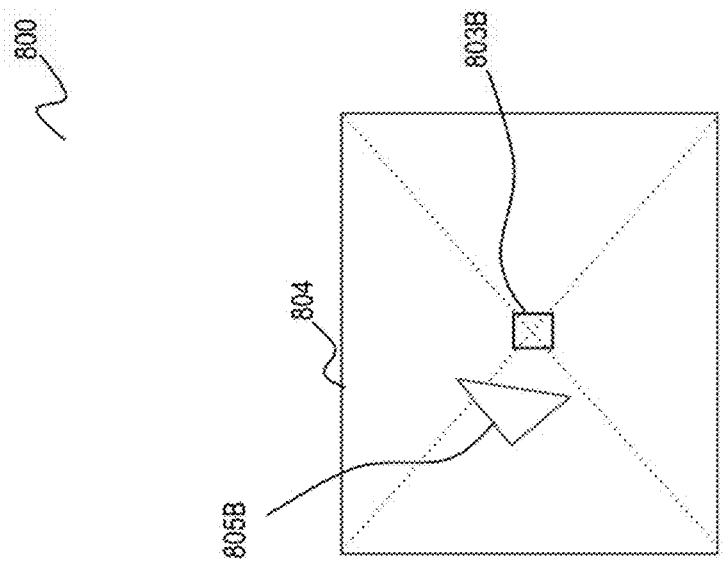
FIG. 8 is an example environment illustrating example sensor data including a region of interest and collimated light.
Figure 8:
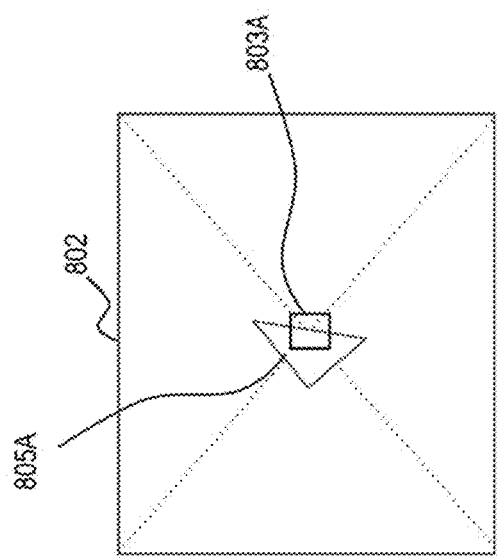

Turning to FIG. 8, FIG. 8 illustrates an example environment 800 illustrating example sensor data including a region of interest and collimated light. In the illustrated example, the signal processing system 502 receives first sensor data 802 and second sensor data 804 from one or more sensors. The signal processing system 502 may implement a region of interest finder to identify a particular region of interest in the received sensor data. In the illustrated example, the signal processing system 502 identifies a first region of interest 803A in the first sensor data 802 and a second region of interest 803B in the second sensor data 804. The signal processing system 502 may identify collimated light within the received sensor data. In the illustrated example, the signal processing system 602 identifies first collimated light 805A in the first sensor data 802 and second collimated light 805B in the second sensor data 804. The signal processing system 602 compares the first collimated light 805A and the first region of interest 803A and compares the second collimated light 805B and the second region of interest 803B to determine whether each region of interest includes a portion of the collimated light (e.g., an edge of the collimated light). In the illustrated example, the signal processing system 602 may determine that the first region of interest 803A includes an edge of the first collimated light 805A and the second region of interest 803B does not include an edge of the second collimated light 805B.

Returning to FIG. 7, based on the region of interest of each of the one or more sensors 704, the signal processing system may determine whether the slanted edge identified by the MTF is located in the region of interest. For example, the signal processing system may verify whether the slanted edge is within a particular range of the region of interest. If the signal processing system identifies the slanted edge in the region of interest for a particular sensor, the signal processing system may determine the sensor and a corresponding collimator are correctly aligned. If the signal processing system does not identify the slanted edge in the region of interest for a particular sensor, the signal processing system may determine the sensor and a corresponding collimator are not correctly aligned. Accordingly, the signal processing system can determine a first subset of the one or more sensors 704 that are correctly aligned with a first subset of the one or more collimators 716 and a second subset of the one or more sensors 704 that are not correctly aligned with a second subset of the one or more collimators 716.

Based on determining the first subset of the one or more sensors 704 that are correctly aligned with the first subset of the one or more collimators 716, the signal processing system can verify the performance of each of the first subset of the one or more sensors 704 using the alignment of the frame 708. The signal processing system can, simultaneously, align any number of one or more sensors 704 with any number of the one or more collimators 716 and, simultaneously or concurrently, verify the performance of each of the one or more sensors 704. For example, the signal processing system can concurrently calibrate multiple sensors. In some cases, the signal processing system can first concurrently calibrate a first set of multiple sensors and second concurrently calibrate a second set of multiple sensors.

In some cases, the signal processing system may not use the alignment of the frame 708 to verify the performance of the second subset of the one or more sensors 704 that are not correctly aligned with the second subset of the one or more collimators 716. Subsequent to verifying the performance of each of the first subset of the one or more sensors 704, the signal processing system can provide instructions to the robot 712 to cause the robot 712 to realign the frame 708 to align the slanted edges in the regions of interest for each of the second subset of the one or more sensors 704. Based on realigning the frame 708, the signal processing system can receive sensor data and determine whether the slanted edge identified by the MTF is located in the region of interest for any of the second subset of the one or more sensors 704.

If the signal processing system determines the slanted edge is located in the region of interest for any of the second subset of the one or more sensors 704, the signal processing system may verify the performance of the particular sensor (s). Further, the signal processing system may realign the frame 708 such that the signal processing system can verify the performance of each of the one or more sensors 704. It will be understood that the signal processing system may realign the frame 708 any number of times to verify the performance of each of the one or more sensors 704.

Based on realigning the frame 708 for a particular sensor of the one or more sensors 704, the signal processing system can identify the shift in the alignment of the frame 708. Based on identifying the shift in the alignment of the frame 708, the signal processing system can cause an adjustment of the frame 708 to correct the alignment of the frame 708. Further, the signal processing system may adjust the robot 712 by providing updated instructions to the robot 712 based on identifying the shift in the alignment of the frame 708. In some cases, based on identifying the shift in the alignment of the frame 708, the signal processing system can cause a repositioning of a particular collimator of the one or more collimators 716 affixed to the frame 708.

In some cases, the signal processing system can store the shift in the alignment in a data store and/or route the shift in the alignment to a computing device (e.g., a user computing device) for further analysis. Further, the signal processing system can link the shift in alignment to the vehicle 702 and/or the particular sensor. In some cases, the signal processing system can link the shift in alignment to the type of the vehicle 702, the configuration of the one or more sensors 704, etc. Based on linking the shift in alignment to the vehicle 702 and/or the particular sensor, the signal processing system can utilize the shift in alignment to verify performance of the one or more sensors 704 of the vehicle 702 and/or to verify performance of one or more additional sensors associated with one or more additional vehicles.

Example Flow Diagram of Signal Processor

Figure 9:
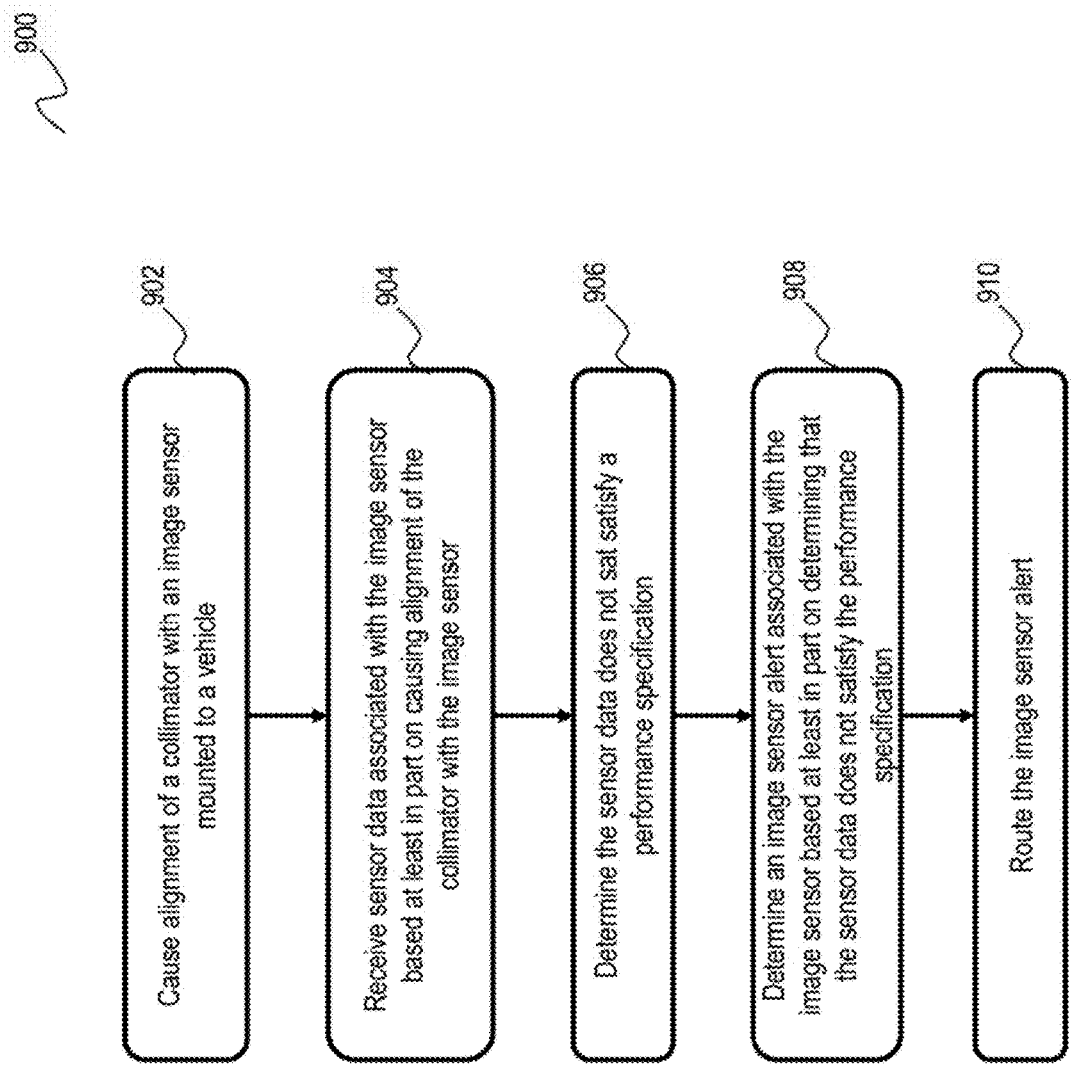
FIG. 9 is a flow diagram illustrating an example of a routine implemented by one or more processors to determine an image sensor alert based on alignment of a collimator with an image sensor.

FIG. 9 is a flow diagram illustrating an example of a routine 900 implemented by one or more processors (e.g., one or more processors of the signal processing system 502). The flow diagram illustrated in FIG. 9 is provided for illustrative purposes only. It will be understood that one or more of the steps of the routine illustrated in FIG. 9 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 902, the signal processing system 502 causes alignment of a collimator with an image sensor mounted to a vehicle. The image sensor may be mounted to the vehicle based on a focus distance and/or a field of view. In some cases, the signal processing system 502 may cause alignment of multiple collimators with multiple image sensor mounted to the vehicle. For example, the signal processing system 502 may cause alignment of a first collimator with a first image sensor mounted to the vehicle and a second collimator with a second image sensor mounted to the vehicle. In some embodiments, the collimator may be a fiber optic collimator that collimates a beam of light (e.g., a laser beam from a solid-state laser).

In some cases, the collimator may be affixed to (e.g., coupled to) a frame (e.g., a frame of collimators). Further, the signal processing system 502, to cause alignment of the collimator with the image sensor, can cause alignment of the frame with the vehicle.

To cause the alignment of the collimator with the image sensor, the signal processing system can send instructions to a robot. Based on the instructions, the robot can cause the alignment of the collimator with the image sensor by aligning the frame with the vehicle. In some cases, the robot may align the frame with the vehicle based on a reference location associated with the vehicle.

Further, based on the alignment of the collimator with the image sensor, the signal processing system 502 may cause a display of light associated with a lighting device. The collimator may capture the light (e.g., a beam of light). Further, the collimator may produce collimated light (e.g., a collimated beam of light) based on capturing the light.

In some cases, the signal processing system 502 may identify a collimator configuration of the collimator. The collimator configuration may include any parameters or settings associated with the collimator. For example, the collimator configuration may include, but is not limited to, a position of the collimator (e.g., a position of the collimator relative to the vehicle, relative to a frame, etc.), an orientation of the collimator, a power usage of the collimator, a frequency of the collimator, a length of the collimator, or a type of the collimator. The collimator configuration may be based on an image sensor type of the image sensor, an image sensor orientation of the image sensor, an image sensor configuration of the image sensor, and/or a vehicle type of the vehicle. For example, the signal processing system 502 may identify a particular collimator configuration that is associated with the image sensor type of the image sensor, the image sensor orientation of the image sensor, the image sensor configuration of the image sensor, and/or the vehicle type of the vehicle. For example, the signal processing system 502 may identify a 50 millimeter collimator for a particular image sensor type and a 100 millimeter collimator for a different image sensor type. The signal processing system 502 may cause alignment of the collimator with the image sensor based on the collimator configuration. For example, the signal processing system 502 may align a 50 millimeter collimator a particular distance (e.g., two feet) from an image sensor and align a 100 millimeter collimator a further distance (e.g., three feet) from an image sensor. In some cases, the signal processing system 502 can receive sensor data associated with the image sensor and verify the collimator configuration of the collimator based on the sensor data.

In some cases, the signal processing system 502 may identify a plurality of collimator configurations and a plurality of image sensor configurations. Further, the signal processing system 502 can generate a plurality of mappings that link a particular image sensor configuration to a particular collimator configuration. The plurality of mappings may include a mapping of an image sensor configuration of the image sensor to a collimator configuration of the collimator. Further, the signal processing system 502 may cause alignment of the collimator with the image sensor based on the image sensor configuration and the collimator configuration.

At block 904, the signal processing system 502 receives sensor data associated with at least one image sensor based at least in part on causing alignment of the collimator with the image sensor. For example, the signal processing system 502 may determine the collimator is aligned with the image sensor. The signal processing system 502 may activate the collimator and the image sensor such that the collimator provides collimated light to the image sensor. Based on receiving the collimated light, the image sensor can generate sensor data and provide the sensor data to the signal processing system 502. The sensor data may further be associated with the vehicle and correspond to image data from image sensors sensing the exterior environment of the vehicle. For example, as described herein, the sensor data may include camera data associated with a camera, lidar data associated with a lidar device, and/or radar data associated with a radar device. In some such cases, the signal processing system 502 may receive the sensor data from a camera image sensor, a lidar sensor, a radar sensor, etc. In some cases, the signal processing system 502 may receive sensor data based on the collimated light from the collimator. The signal processing system 502 may process the sensor data to generate performance data (e.g., optical performance data) associated with the performance of the image sensor. For example, the signal processing system 502 may generate performance data that identifies the performance of the image sensor. In some cases, the performance data may include modulation transfer function data, optical transfer function data, phase transfer function data, etc.

In some cases, the performance data may include calibration data (e.g., a first set of intrinsic parameters) associated with the calibration of the image sensor. For example, the calibration data can include intrinsic parameters such as a scale factor, a focal length, a principal point (e.g., a sensor center), a skew, a geometric distortion, etc. associated with the image sensor. The image sensor may generate sensor data based on the intrinsic parameters. The signal processing system 502 may calibrate the image sensor using the received sensor data to generate the calibration data associated with the image sensor. For example, the signal processing system 502 may use captured lidar data to calibrate a principal point of a lidar image sensor. The lidar image sensor may capture additional lidar data based on the calibrated principal point of the lidar image sensor.

In some cases, the signal processing system 502 may verify the alignment of the collimator with the image sensor based on the sensor data. In certain cases, to verify the alignment, the signal processing system 502 may determine a first region of interest (e.g., a center of the image sensor) for the image sensor based on the sensor data. For example, the signal processing system 502 may identify a portion of the image sensor (e.g., the region of interest) that is expected to receive collimated light. In some cases, the signal processing system 502 may determine the first region of interest does not include a slanted edge (e.g., a miter edge). Based on determining the first region of interest does not include the slanted edge, the signal processing system 502 can cause an adjustment of the collimator, the frame, the robot, etc. For example, if the signal processing system 502 does not detect the slanted edge in the region of interest, the signal processing system 502 can cause the robot to move the frame, the robot, or the collimator to adjust the position or orientation of the collimator.

Following an adjustment of the collimator, frame, and/or robot, the signal processing system 502 can receive updated sensor data associated with the image sensor. The signal processing system 502 may further determine a second region of interest for the image sensor based on the updated sensor data. For example, the signal processing system 502 may receive the updated sensor data and identify an updated region of interest (e.g., a center of the image sensor) for the image sensor based on the updated sensor data. The signal processing system 502 may verify the alignment of the collimator with the image sensor based on determining the second region of interest includes the slanted edge. For example, the signal processing system 502 identify a portion of the image sensor (e.g., the region of interest) that is expected to receive collimated light and may confirm that a slanted edge of the collimated light is in the region of interest.

At block 906, the signal processing system 502 determines the sensor data does not satisfy a performance specification (e.g., a performance threshold). The performance specification may be associated with the image sensor. For example, the performance specification can indicate expected values for different parameters for the image sensor. In some cases, the signal processing system 502 may receive the performance specification from a computing device identifying that the performance specification is associated with the image sensor. For example, a user, via a user computing device, may indicate a performance specification associated with the image sensor. Based on determining the performance specification is associated with the image sensor, the signal processing system 502 may determine the sensor data does not satisfy the performance specification. For example, the signal processing system 502 may identify a performance specification and compare the sensor data with the performance specification and determine that the sensor data includes values less than, greater than, or outside of a range of values provided by the performance specification.

In some cases, to compare the sensor data with the performance specification, the signal processing system 502 may compare optical performance data based on the sensor data with an optical performance data specification (e.g., an optical performance data specification, a modulation transfer function data specification, etc.). For example, the signal processing system 502 may verify whether the optical performance data satisfies (e.g., matches, is below than, is greater than, is within a particular range of, etc.) the optical performance data specification. Based on the comparison of the optical performance data with the optical performance data specification, the signal processing system 502 may determine that the sensor data does not satisfy the performance specification.

In some cases, the signal processing system 502 may compare calibration data (e.g., intrinsic parameters associated with the image sensor such as a scale factor, a focal length, a principal point (e.g., a sensor center), a skew, a geometric distortion, etc.) based on the sensor data with a calibration data specification (e.g., a second set of intrinsic parameters). For example, the signal processing system 502 may verify whether the calibration data satisfies (e.g., matches, is below than, is greater than, is within a particular range of, etc.) the calibration data specification by comparing the calibration data with the calibration data specification. In certain cases, to compare the calibration data and the calibration data threshold, the signal processing system 502 may perform a ray angle comparison and/or a reprojection error comparison. Based on the comparison of the calibration data with the calibration data specification, the signal processing system 502 may determine that the sensor data does not satisfy the performance specification.

At block 908, the signal processing system 502 determines an image sensor alert associated with the image sensor based at least in part on determining that the sensor data does not satisfy the performance specification. For example, the signal processing system 502 may generate the image sensor alert based on determining the sensor data does not satisfy the performance threshold (e.g., based on comparing the performance data and the performance specification). In some cases, the image sensor alert may identify a measure of optical performance of the image sensor and/or a measure of intrinsic calibration of the image sensor. For example, the image sensor alert may identify a difference between the optical performance and/or the intrinsic calibration of the image sensor and the performance specification.

In some cases, the signal processing system 502 may update the intrinsic parameters of the image sensor based on the image sensor alert. For example, the signal processing system 502 may identify a third set of intrinsic parameters (e.g., the first set of intrinsic parameters, the second set of intrinsic parameters, a separate set of intrinsic parameters). In some cases, the signal processing system 502 may provide the updated intrinsic parameters (e.g., to a user) as recommended intrinsic parameters for the image sensor. For example, the signal processing system 502 may cause display of the updated intrinsic parameters on a user computing device and may indicate that the updated intrinsic parameters are recommended for the image sensor.

At block 910, the signal processing system 502 routes the image sensor alert. Further, the signal processing system 502 may route the image sensor alert to a data store and/or to a computing device (e.g., a user computing device). In some cases, the signal processing system 502 may route the image sensor for additional testing based on the image sensor alert. For example, the signal processing system 502 may route the image sensor alert to a robotic device. Further, the image sensor alert may cause the robotic device to obtain the image sensor and transport the image sensor for additional testing.

In some cases, based on routing the image sensor alert, the signal processing system 502 (or a separate computing system) may update the image sensor based on the third set of intrinsic parameters. Further, the image sensor may generate additional sensor data based on the third set of intrinsic parameters.

In some cases, the signal processing system 502 may determine the collimator has shifted from a first position to a second position. Based on the determination that the collimator has shifted, the signal processing system 502 can identify a correction factor. Further, the signal processing system 502 can apply the correction factor to a robot that causes alignment of the collimator with the image sensor. Based on applying the correction factor to the robot, the robot may adjust the alignment of the collimator with the image sensor. In some embodiments, based on applying the correction factor to the robot, the robot may cause alignment of a second image sensor associated with a second vehicle with a second collimator based on the correction factor.

It will be understood that the routine 900 can be repeated multiple times using different image sensors and/or different sensor data. In some cases, the signal processing system 502 may iteratively repeat the routine 900 for multiple sets of sensor data that are received from multiple image sensors. In certain cases, the signal processing system 502 uses the routine 900 to concurrently calibrate multiple image sensors of a vehicle. In some cases, the signal processing system 502 uses the routine 900 to concurrently calibrate a first set image sensors of a vehicle, adjusts the position and/or orientation of one or more collimators, and concurrently calibrates a second set of one or more image sensors of the vehicle. In certain cases, the signal processing system 502 can repeat this process until some or all of the image sensors of the vehicle are calibrated or identified for further modification (e.g., relevant image sensor alert is generated and routed).

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

Various additional example embodiments of the disclosure can be described by the following clauses:

Clause 1: A method, comprising:
  causing alignment of a collimator with an image sensor mounted to a vehicle;
  receiving, using at least one processor, sensor data associated with the image sensor based at least in part on causing the alignment of the collimator with the image sensor;
  determining that the sensor data does not satisfy a performance threshold associated with the image sensor;
  determining an image sensor alert associated with the image sensor based at least in part on the determining that the sensor data does not satisfy the performance threshold associated with the image sensor; and
  routing the image sensor alert.

Clause 2: The method of Clause 1, wherein determining that the sensor data does not satisfy the performance threshold comprises:
  determining first modulation transfer function data associated with the image sensor based at least in part on the sensor data;
  comparing the first modulation transfer function data with a modulation transfer function data threshold; and
  determining that the sensor data does not satisfy the performance threshold based at least in part on comparing the first modulation transfer function data with the modulation transfer function data threshold, wherein the image sensor is routed for additional testing based at least in part on the image sensor alert.

Clause 3: The method of Clause 1 or Clause 2, wherein the image sensor alert comprises at least one of a measure of optical performance of the image sensor or a measure of intrinsic calibration of the image sensor.

Clause 4: The method of any one of Clauses 1 through 3, wherein the performance threshold comprises a calibration data threshold, wherein determining the image sensor alert comprises:
  calibrating the image sensor based at least in part on the sensor data to generate calibration data associated with the image sensor;
  comparing the calibration data with the calibration data threshold; and
  generating the image sensor alert based at least in part on comparing the calibration data with the calibration data threshold.

Clause 5: The method of Clause 4, wherein comparing the calibration data with the calibration data threshold comprises at least one of a ray angle comparison or a reprojection error comparison.

Clause 6: The method of Clause 4 or Clause 5, wherein the calibration data comprises a first set of intrinsic parameters associated with the image sensor, wherein the sensor data is based at least in part on the first set of intrinsic parameters, wherein the calibration data threshold comprises a second set of intrinsic parameters, the method further comprising identifying a third set of intrinsic parameters based at least in part on the image sensor alert, wherein the third set of intrinsic parameters comprise the first set of intrinsic parameters or the second set of intrinsic parameters.

Clause 7: The method of Clause 6, wherein the sensor data is first sensor data, the method further comprising:
updating the image sensor based at least in part on the third set of intrinsic parameters; and
receiving, using at least one processor, second sensor data associated with the image sensor based at least in part on the third intrinsic parameters.

Clause 8: The method of any one of Clauses 1 through 7, wherein the image sensor is a first image sensor and the collimator is a first collimator, the method further comprising: causing alignment of a second collimator with a second image sensor mounted to the vehicle, wherein the first collimator and the second collimator are mounted to a frame.

Clause 9: The method of any one of Clauses 1 through 8, further comprising:
causing display of light associated with a lighting device;
capturing, by the collimator, the light; and
producing collimated light based at least in part on capturing the light, wherein receiving the sensor data is based at least in part on the collimated light.

Clause 10: The method of any one of Clauses 1 through 9, wherein a robot causes the alignment of the collimator with the image sensor by aligning a frame with the vehicle based at least in part on a reference location associated with the vehicle, wherein the collimator is coupled to the frame.

Clause 11: The method of any one of Clauses 1 through 10, wherein the image sensor is mounted to the vehicle based at least in part on a focus distance or a field-of-view.

Clause 12: The method of any one of Clauses 1 through 11, wherein causing alignment of the collimator with the image sensor comprises:
determining a first region of interest for the image sensor based at least in part on the sensor data;
determining the first region of interest does not include a miter edge;
causing an adjustment of the collimator based at least in part on determining the region of interest does not include the miter edge;
receiving, using at least one processor, updated sensor data associated with the image sensor based at least in part on causing the adjustment of the collimator;
determining a second region of interest for the image sensor based at least in part on the updated sensor data; and
determining the second region of interest includes the miter edge.

Clause 13: The method of any one of Clauses 1 through 12, wherein a robot causes alignment of the collimator with the image sensor, the method further comprising:
determining the collimator has shifted from a first position to a second position;
identifying a correction factor based at least in part on determining the collimator has shifted from a first position to a second position; and
applying the correction factor to the robot, wherein the correction factor causes the robot to adjust the alignment of the collimator with the image sensor.

Clause 14: The method of Clause 13, wherein the vehicle is a first vehicle, the image sensor is a first image sensor, and the collimator is a first collimator, the method further comprising causing alignment of a second image sensor associated with a second vehicle with a second collimator based at least in part on the correction factor.

Clause 15: The method of any one of Clauses 1 through 14, wherein the sensor data is first sensor data, wherein causing alignment of the collimator with the image sensor comprises:
identifying a collimator configuration of the collimator based at least in part on the alignment of the image sensor with the collimator;
receiving, using at least one processor, second sensor data associated with the image sensor; and
verifying the collimator configuration of the collimator based at least in part on the second sensor data.

Clause 16: The method of any one of Clauses 1 through 15, wherein causing alignment of the collimator with the image sensor comprises:
identifying at least one of an image sensor type of the image sensor, an image sensor orientation of the image sensor, an image sensor configuration of the image sensor, or a vehicle type of the vehicle;
identifying a collimator configuration of the collimator based at least in part on the at least one of the image sensor type of the image sensor, the image sensor orientation of the image sensor, the image sensor configuration of the image sensor, or the vehicle type of the vehicle; and
causing alignment of the collimator with the image sensor is based at least in part on the collimator configuration of the collimator.

Clause 17: The method of any one of Clauses 1 through 16, further comprising:
identifying a plurality of image sensor configurations;
identifying a plurality of collimator configurations; and
generating a plurality of mappings, wherein each mapping of the plurality of mappings maps a particular image sensor configuration of the plurality of image sensor configurations to a particular collimator configuration of the plurality of collimator configurations, wherein the plurality of mappings comprises a mapping of an image sensor configuration of the plurality of image sensor configurations to a collimator configuration of the plurality of collimator configurations, wherein causing alignment of the collimator with the image sensor is based at least in part on the image sensor configuration and the collimator configuration.

Clause 18: The method of any one of Clauses 1 through 17, wherein the collimator is a fiber optic collimator, wherein the fiber optic collimator collimates a laser beam from a solid-state laser.

Clause 19: A system, comprising:
at least one processor, and
at least one non-transitory storage media storing instructions that, when executed by the at least one processor, cause the at least one processor to:
cause alignment of a collimator with an image sensor mounted to a vehicle;
receive sensor data associated with the image sensor based at least in part on causing the alignment of the collimator with the image sensor;
determine that the sensor data does not satisfy a performance threshold associated with the image sensor;
determine an image sensor alert associated with the image sensor based at least in part on determining that the sensor data does not satisfy the performance threshold associated with the image sensor; and
route the image sensor alert.

Clause 20: At least one non-transitory storage media storing instructions that, when executed by a computing system comprising a processor, cause the computing system to:
- cause alignment of a collimator with an image sensor mounted to a vehicle;
- receive sensor data associated with the image sensor based at least in part on causing the alignment of the collimator with the image sensor;
- determine that the sensor data does not satisfy a performance threshold associated with the image sensor;
- determine an image sensor alert associated with the image sensor based at least in part on determining that the sensor data does not satisfy the performance threshold associated with the image sensor; and
- route the image sensor alert.

What is claimed is:

1. A method, comprising:
causing alignment of a collimator with an image sensor mounted to a vehicle;
responsive to causing the alignment of the collimator with the image sensor, receiving, using at least one processor, sensor data from the image sensor aligned with the collimator;
determining that performance data associated with the image sensor does not satisfy a performance threshold associated with the image sensor based at least in part on the sensor data received from the image sensor aligned with the collimator;
determining an image sensor alert associated with the image sensor based at least in part on determining that the performance data does not satisfy the performance threshold; and
routing the image sensor alert.

2. The method of claim 1, wherein determining that the performance data does not satisfy the performance threshold comprises:
determining first modulation transfer function data associated with the image sensor based at least in part on the sensor data received from the image sensor aligned with the collimator;
comparing the first modulation transfer function data with a modulation transfer function data threshold; and
determining that the performance data does not satisfy the performance threshold based at least in part on comparing the first modulation transfer function data with the modulation transfer function data threshold, wherein the image sensor is routed for additional testing based at least in part on the image sensor alert.

3. The method of claim 1, wherein the performance data comprises at least one of optical performance data or intrinsic calibration data.

4. The method of claim 1, wherein the performance threshold comprises a calibration data threshold, wherein determining the image sensor alert comprises:
calibrating the image sensor based at least in part on the sensor data received from the image sensor aligned with the collimator to generate calibration data associated with the image sensor;
comparing the calibration data with the calibration data threshold; and
generating the image sensor alert based at least in part on comparing the calibration data with the calibration data threshold.

5. The method of claim 4, wherein comparing the calibration data with the calibration data threshold comprises at least one of a ray angle comparison or a reprojection error comparison.

6. The method of claim 4, wherein the calibration data comprises a first set of intrinsic parameters associated with the image sensor, wherein the sensor data received from the image sensor aligned with the collimator is based at least in part on the first set of intrinsic parameters, wherein the calibration data threshold comprises a second set of intrinsic parameters, the method further comprising:
identifying a third set of intrinsic parameters based at least in part on the image sensor alert, wherein the third set of intrinsic parameters comprise the first set of intrinsic parameters or the second set of intrinsic parameters.

7. The method of claim 6, wherein the sensor data received from the image sensor aligned with the collimator is first sensor data, the method further comprising:
updating the image sensor based at least in part on the third set of intrinsic parameters; and
receiving second sensor data from the image sensor aligned with the collimator based at least in part on the third set of intrinsic parameters.

8. The method of claim 1, wherein the image sensor is a first image sensor and the collimator is a first collimator, the method further comprising:
causing alignment of a second collimator with a second image sensor mounted to the vehicle, wherein the first collimator and the second collimator are mounted to a frame.

9. The method of claim 1, further comprising:
causing display of light associated with a lighting device;
capturing, by the collimator, the light; and
producing collimated light based at least in part on capturing the light, wherein receiving the sensor data is based at least in part on the collimated light.

10. The method of claim 1, wherein a robot causes the alignment of the collimator with the image sensor by aligning a frame with the vehicle based at least in part on a reference location associated with the vehicle, wherein the collimator is coupled to the frame.

11. The method of claim 1, wherein the image sensor is mounted to the vehicle based at least in part on a focus distance or a field-of-view.

12. The method of claim 1, wherein causing alignment of the collimator with the image sensor comprises:
determining a first region of interest for the image sensor based at least in part on the sensor data received from the image sensor aligned with the collimator;
determining the first region of interest does not include a miter edge;
causing an adjustment of the collimator based at least in part on determining the first region of interest does not include the miter edge;
receiving updated sensor data from the image sensor aligned with the collimator based at least in part on causing the adjustment of the collimator;
determining a second region of interest for the image sensor based at least in part on the updated sensor data received from the image sensor aligned with the collimator; and
determining the second region of interest includes the miter edge.

13. The method of claim 1, wherein a robot causes alignment of the collimator with the image sensor, the method further comprising:

determining the collimator has shifted from a first position to a second position;

identifying a correction factor based at least in part on determining the collimator has shifted from a first position to a second position; and applying the correction factor to the robot, wherein the correction factor causes the robot to adjust the alignment of the collimator with the image sensor.

14. The method of claim 13, wherein the vehicle is a first vehicle, the image sensor is a first image sensor, and the collimator is a first collimator, the method further comprising:

causing alignment of a second image sensor associated with a second vehicle with a second collimator based at least in part on the correction factor.

15. The method of claim 1, wherein the sensor data received from the image sensor aligned with the collimator is first sensor data, wherein causing alignment of the collimator with the image sensor comprises:

identifying a collimator configuration of the collimator based at least in part on the alignment of the image sensor with the collimator;

receiving, using at least one processor, second sensor data from the image sensor aligned with the collimator; and verifying the collimator configuration of the collimator based at least in part on the second sensor data received from the image sensor aligned with the collimator.

16. The method of claim 1, wherein causing alignment of the collimator with the image sensor comprises:

identifying at least one of an image sensor type of the image sensor, an image sensor orientation of the image sensor, an image sensor configuration of the image sensor, or a vehicle type of the vehicle;

identifying a collimator configuration of the collimator based at least in part on the at least one of the image sensor type of the image sensor, the image sensor orientation of the image sensor, the image sensor configuration of the image sensor, or the vehicle type of the vehicle; and causing alignment of the collimator with the image sensor is based at least in part on the collimator configuration of the collimator.

17. The method of claim 1, further comprising:

identifying a plurality of image sensor configurations;

identifying a plurality of collimator configurations; and generating a plurality of mappings, wherein each mapping of the plurality of mappings maps a particular image sensor configuration of the plurality of image sensor configurations to a particular collimator configuration of the plurality of collimator configurations, wherein the plurality of mappings comprises a mapping of an image sensor configuration of the plurality of image sensor configurations to a collimator configuration of the plurality of collimator configurations, wherein causing alignment of the collimator with the image sensor is based at least in part on the image sensor configuration and the collimator configuration.

18. The method of claim 1, wherein the collimator is a fiber optic collimator, wherein the fiber optic collimator collimates a laser beam from a solid-state laser.

19. A system, comprising:

at least one processor, and at least one non-transitory storage media storing instructions that, when executed by the at least one processor, cause the at least one processor to:

cause alignment of a collimator with an image sensor mounted to a vehicle;

responsive to causing the alignment of the collimator with the image sensor, receive sensor data from the image sensor aligned with the collimator;

determine that performance data associated with the image sensor does not satisfy a performance threshold associated with the image sensor based at least in part on the sensor data received from the image sensor aligned with the collimator;

determine an image sensor alert associated with the image sensor based at least in part on determining that the performance data does not satisfy the performance threshold; and route the image sensor alert.

20. At least one non-transitory storage media storing instructions that, when executed by a computing system comprising a processor, cause the computing system to:

cause alignment of a collimator with an image sensor mounted to a vehicle;

responsive to causing the alignment of the collimator with the image sensor, receive sensor data from the image sensor aligned with the collimator;

determine that performance data associated with the image sensor does not satisfy a performance threshold associated with the image sensor based at least in part on the sensor data received from the image sensor aligned with the collimator;

determine an image sensor alert associated with the image sensor based at least in part on determining that the performance data does not satisfy the performance threshold; and route the image sensor alert.

* * * * *